United States Patent [19]

Redden et al.

[11] Patent Number: 5,537,681
[45] Date of Patent: Jul. 16, 1996

[54] COMMUNICATION NETWORK WITH INCOMING CALLS DIRECTED THROUGH MOVING CELLS AND METHOD FOR OPERATING SAME

[75] Inventors: James P. Redden, Mesa; Kenneth L. Sowles, Chandler; David Terris, Phoenix, all of Ariz.

[73] Assignee: Motorola, Inc., Schaumburg, Ill.

[21] Appl. No.: 235,995

[22] Filed: May 2, 1994

[51] Int. Cl.⁶ ..................................................... H04Q 7/00
[52] U.S. Cl. ...................... 455/33.1; 455/12.1; 455/13.1; 455/54.1
[58] Field of Search .................... 455/12.1, 13.1, 455/13.2, 33.1, 33.4, 54.1, 56.1, 51.1; 379/59; 342/357, 352

[56] References Cited

U.S. PATENT DOCUMENTS

| | | | |
|---|---|---|---|
| 5,020,091 | 5/1991 | Krolopp et al. | 379/58 |
| 5,097,499 | 3/1992 | Cosentino | 379/59 |
| 5,142,654 | 8/1992 | Sonberg et al. | 379/59 |
| 5,153,902 | 10/1992 | Buhl et al. | 379/57 |
| 5,212,822 | 5/1993 | Fukumine et al. | 455/33.1 |
| 5,408,237 | 4/1995 | Patterson et al. | 455/12.1 |

*Primary Examiner*—Reinhard J. Eisenzopf
*Assistant Examiner*—Marsha D. Banks-Harold
*Attorney, Agent, or Firm*—Harold C. McGurk, IV; Phillip E. Hall

[57] ABSTRACT

A network includes a system and a population of subscriber units. System satellites move in low earth orbits and form moving cells on the surface of the earth. A pattern of static areas that covers the service area of the system is defined in a map. The system discovers the static areas for the subscriber units. When an incoming call needs to be directed to a subscriber unit, the subscriber unit's static area is converted into identities of beams that form the cells that coincide with the static area. A ring signal is transmitted in only these cells. Subscriber units monitor area identification signals that identify the static areas coincident with the cells where the signals are transmitted. When the static area known by the system is not among the identified static areas, a subscriber unit engages in re-registration communications.

20 Claims, 7 Drawing Sheets

5,537,681

COMMUNICATION NETWORK WITH INCOMING CALLS DIRECTED THROUGH MOVING CELLS AND METHOD FOR OPERATING SAME

TECHNICAL FIELD OF THE INVENTION

The present invention relates generally to cellular communication networks. More specifically, the present invention relates to such networks in which cells move relative to the earth.

BACKGROUND OF THE INVENTION

In a conventional cellular communication network, the spectrum used by the network for communication services is divided into several portions, and these portions are assigned to geographic cells in accordance with a reuse scheme. The reuse scheme defines how the spectrum portions are "reused" in spaced apart cells. Cells located near one another are assigned different spectrum portions so that no interference occurs in these cells. The network components are configured to limit the range of their communication signals so that interference is prevented in cells to which common spectrum portions are re-assigned.

In conventional cellular communication networks, mobile subscriber units are free to move about, but the cells typically do not move. Over the years, a significant body of equipment, such as mobile telecommunication switching offices (MTSOs), has been developed to support conventional cellular communication networks. In some networks, such as the Groupe Special Mobile (GSM) network, MTSOs keep track of the mobile units that are within their jurisdictions. When mobile units travel to new cells, they inform the system of their presence, and the MTSO updates a code that identifies the cell where the mobile unit is now located. Thus, when an incoming call for the mobile unit occurs, the system knows in which cell to transmit ring signals.

This conventional scheme adequately achieves the goals of cellular communication networks in which cells are static. The network needs to expend spectrum resources only in the cell where a mobile unit resides rather than over the entire service area covered by the network. In addition, only a small amount of memory and processing resources are consumed in maintaining current MTSO records for mobile unit locations and in identifying where to direct incoming calls.

However, when a cellular communication network uses cells that move relative to the earth, the conventional scheme for tracking mobile unit locations becomes impractical. When cells move, all mobile units find themselves in new cells from time to time regardless of any mobile unit movement. If a conventional scheme were used, the amount of overhead resources required to keep the system informed of the cells within which each subscriber unit resides would be excessive because all mobile units would incessantly consume network resources informing the system of their locations.

SUMMARY OF THE INVENTION

Accordingly, it is an advantage of the present invention that an improved cellular communication network and an improved subscriber unit is provided.

Another advantage of the present invention is that a cellular communication network is provided in which incoming calls are directed through moving cells.

Another advantage is that the present invention permits existing static-cell cellular equipment, such as MTSOs, to be used in connection with a moving-cell cellular communication network.

Another advantage is that only a small amount of spectrum resources are required to track subscriber unit locations.

Another advantage is that only a small amount of memory and processing resources are required to track subscriber unit locations.

Another advantage is that the subscriber unit notifies the communication network when the received area identification signal does not match prior known signals and informs the communication network of the new area identification signal received.

The above and other advantages of the present invention are carried out in one form by a moving-cell cellular communication system having subscriber units wherein communications take place through antenna beams which form moving cells and in which subscriber units occasionally receive incoming calls through a portion of these communications. The system is operated in accordance with a method for determining where to direct the incoming calls. This method calls for defining a pattern of static areas so that one of the subscriber units resides in one of the static areas. The one static area where the one subscriber unit resides is identified. A request to direct an incoming call to this one subscriber unit is received. In response to the receipt of this request, the antenna beam that forms a first cell, where this first cell coincides with the one static area where the one subscriber unit resides, is determined. A message is then transmitted through the antenna beam that forms the first cell.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
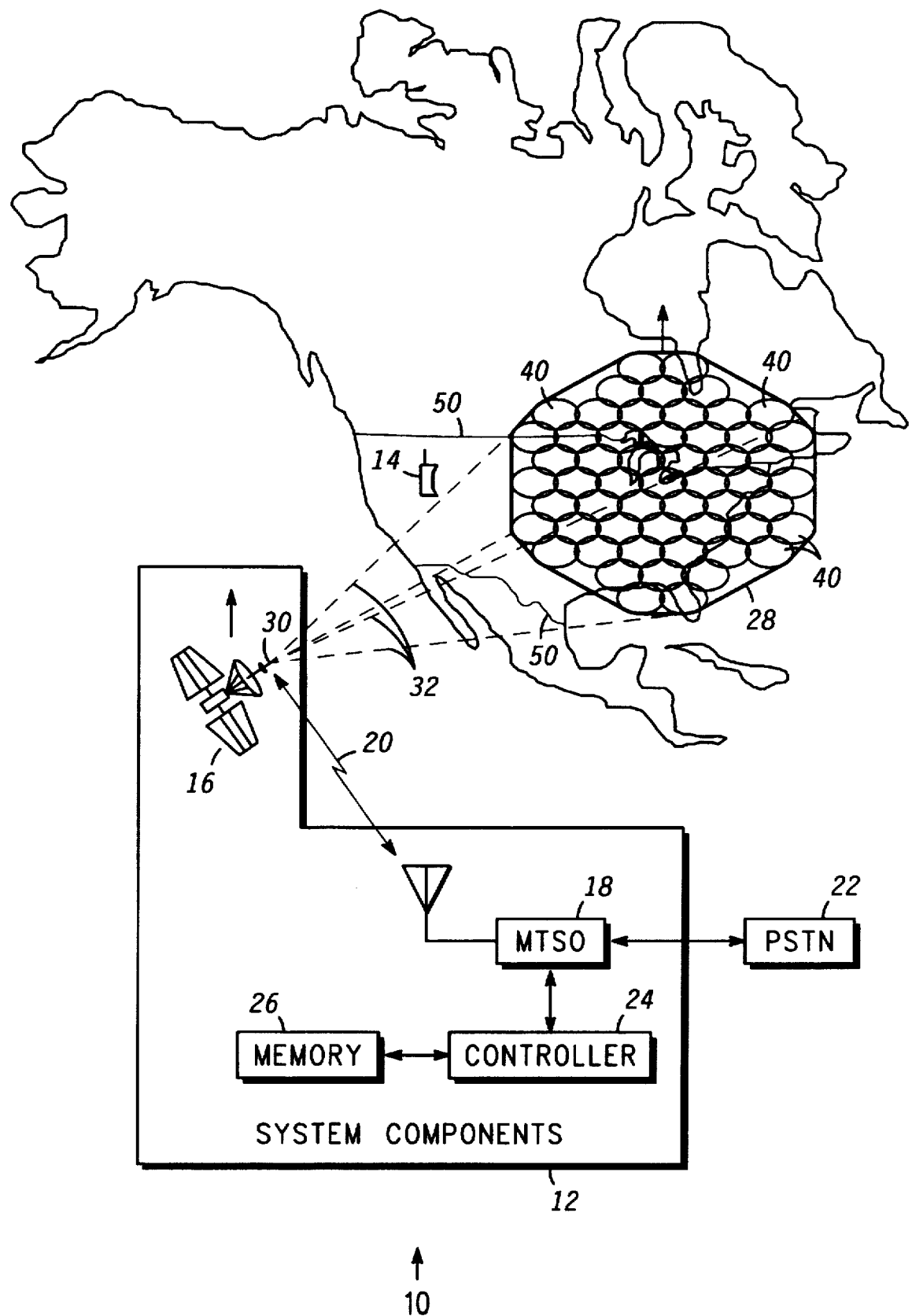
FIG. 1 shows a diagrammatic illustration of an environment within which a communication network constructed in accordance with the present invention may operate.

FIG. 1 presents a schematic illustration of an environment within which a communication network 10 operates. Network 10 is a moving-cell cellular communication network. Network 10 includes system components 12, hereinafter referred to as system 12, and a population with potentially millions of members of subscriber units 14. Network 10 may alternately include only a few subscriber units 14, and FIG. 1 shows only one subscriber unit 14 for clarity.

System 12 includes a constellation of satellites 16, of which FIG. 1 shows only one. Satellites 16 are placed in orbits around the earth. The preferred configuration of the constellation of satellites 16 allows at least one of satellites 16 to be within view of each point on the surface of the earth at all times. Due to their orbits, satellites 16 constantly move relative to the earth. In the preferred embodiments, satellites 16 move in orbits at an altitude in the range of 500–1000 Km above the earth and at a speed of around 25,000 km/hr.

System 12 additionally includes one or more mobile telecommunication switching offices (MTSOs) 18. Conventional MTSOs, such as those used in the Groupe Special Mobile (GSM) network, are desirably used for MTSOs 18. MTSOs 18 reside on the surface of the earth and are adapted to be in data communication with nearby ones of satellites 16 through RF communication links 20. Satellites 16 are also in data communication with one another through other data communication links (not shown). Each MTSO 18 is preferably associated with one or more specific geopolitical regions, such as one or more countries, and each MTSO 18 controls network communications for its associated region. MTSOs 18 couple to public switched telecommunication networks (PSTNs) 22, from which calls directed toward subscribers of network 10 may be received and to which calls placed by subscribers of network 10 may be sent.

Each MTSOs 18 couples to and is in data communication with a controller 24. Controller 24 represents a data processing device, such as a computer. Controller 24 couples to and is in data communication with a memory 26. Memory 26 stores tables, databases, lists, and other memory structures that are useful, as discussed in more detail below, in carrying out a preferred embodiment of the present invention. In addition, memory 26 includes data which serve as instructions to controller 24 and which, when executed by controller 24, cause system 12 to carry out processes which are discussed below.

In general, network 10 has many nodes. Each subscriber unit 14, satellite 16, MTSO 18, and/or controller 24 represents a node of network 10. All nodes of network 10 are in data communication with other nodes of network 10 through various communication links. In addition, all nodes of network 10 can be in data communication with other telephonic devices dispersed throughout the world through PSTNs 22.

Subscriber units 14 are configured to communicate with satellites 16 over portions of the electromagnetic spectrum that are allocated by government agencies associated with the various geopolitical regions. Although not shown in FIG. 1, subscriber units may be configured as programmable radios which include microprocessors or other controllers that perform instructions that are stored in memory and are designed to cause subscriber units 14 to perform desired tasks. Network 10 accommodates the movement of subscriber units 14 anywhere on or near the surface of the earth, but nothing requires subscriber units 14 to move.

System 12 desirably provides a variety of services for subscriber units 14. For example, such services may include the establishment of connections, circuits, data communication channels, and the like, necessary for routing an incoming call to a subscriber unit 14 or an outgoing call from a subscriber unit 14. In addition, such services may include a re-registration process through which a subscriber unit 14 informs system 10 of its location so that future incoming calls may be correctly directed to the area where the subscriber unit 14 is likely to be.

Communication services, including calls, may be set up between two subscriber units 14 or between any subscriber unit 14 and a PSTN phone number. Calls may be set up between any two locations on the earth, assuming appropriate licenses have been obtained in geopolitical jurisdictions where the locations reside and any other qualifications imposed by such jurisdictions are met. Generally speaking, each subscriber unit 14 communicates with system 12 during call setup and during re-registration.

A single satellite 16 forms a cellular footprint 28 formed on the surface of the earth. Each satellite 16 includes a multibeam antenna 30. Each antenna 30 projects numerous discrete antenna beams 32 toward the earth's surface at numerous diverse angles away from its satellite 16. FIG. 1 shows a diagram of a resulting pattern of cells 40 that beams 32 form on the surface of the earth. Each beam 32 is associated with a cell 40 in a one-to-one correspondence. Cells 40 move over the surface of the earth in response to the movement of satellites 16. Due to the potentially fast speeds at which satellites 16 move, subscriber units 14 may reside within any one cell for only a few minutes.

Those skilled in the art will appreciate that the multiple beams 32 formed by antenna 30 define a geometry and do not imply a particular direction of communication. In other words, communications may be transmitted and/or received through the beams 32 projected by antenna 30 toward the earth's surface. For clarity, the schematic illustration of FIG. 1 shows cells 40 and footprint 28 as being discrete, roughly elliptical shapes with only minor overlaps and gaps. However, those skilled in the art will understand that in actual practice equal strength lines projected by beams 32 from antennas 30 of satellites 16 may actually have far different shapes, that antenna side lobes may distort the patterns, that some cells 40 may cover larger areas than other cells 40, and that significant overlaps between cells 40 may be expected.

In the preferred embodiment of the present invention, all satellites 16 are configured substantially as depicted in FIG. 1. Thus, other satellites 16 (not shown) form other similar footprints 28 (not shown). Desirably, a continuous blanket of cells 40 substantially covers the entire surface of the earth. Thus, system 12 covers a wide service area roughly equivalent to the entire earth's surface, and system 12 may simultaneously manage up to thousands of different moving cells 40.

Generally speaking, subscriber units 14 monitor signals broadcast from satellites 16 for the purpose of receiving ring messages directed to them. A ring message conveys data identifying a specific subscriber unit 14 to which an incoming call is directed. System 12 maintains records which identify the locations of subscriber units 14. When incoming calls are requested, ring messages are transmitted in as few cells 40 as possible so that the spectrum resources for all other cells 40 are not wasted. These few cells are identified through the recorded locations for the subscriber units 14.

On the surface of the earth different geopolitical regions share common geopolitical borders 50. As discussed below, network 10 accommodates geopolitical borders 50 so that different geopolitical entities, such as countries or groups of countries, can exert different influences on the communication services delivered by system 12 within their jurisdictions. For example, system 12 may qualify communication services provided to a subscriber unit 14 in accordance with the geopolitical region in which the subscriber unit 14 currently resides. Such qualification may include permitting or denying services or assigning unique tariffs or rate charges on the services provided within a geopolitical entity's jurisdiction.

Figure 2:
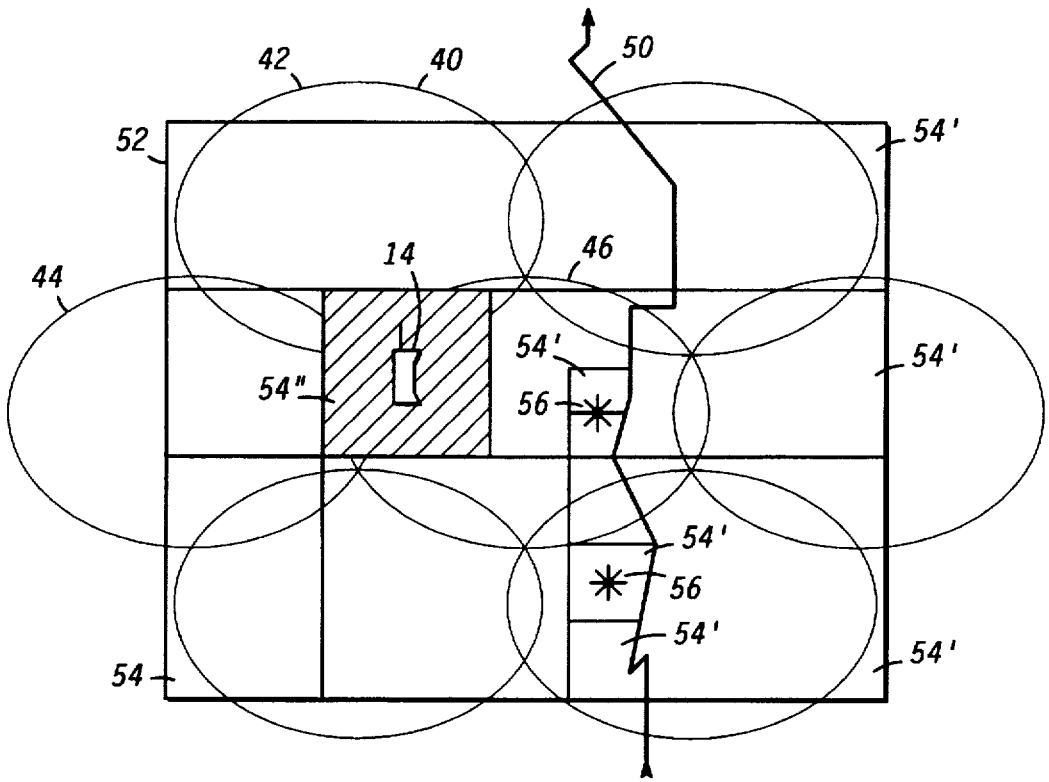
FIG. 2 shows a first illustration of a small portion of a service area for the communication network.

FIG. 2 shows a schematic illustration of a small portion of the service area for network 10. To accommodate the recording of locations for subscriber units 14, to maintain compatibility with conventional MTSOs 18, and/or to accommodate geopolitical borders 50, network 10 employs a pattern 52 of static areas 54 which overlies the service area of network 10. Pattern 52 describes a map that network 10 uses in directing incoming calls through moving cells 40. As illustrated in FIG. 2, static areas 54 desirably do not overlap one another. Moreover, static areas 54 may vary in size and shape. Those skilled in the art will appreciate that static areas 54 are considered static relative to moving cells 40. From time to time the pattern 52 of static areas 54 can be altered, added to, and otherwise changed when system 12 benefits from such a change.

When a static area 54 resides in the vicinity of a geopolitical border 50, the shape of that static area 54 may conform to that border 50, as illustrated by static areas 54', so that static areas 54 do not overlie the border 50. By defining static areas 54 to conform to geopolitical borders 50, re-registration processes are likely to take place as subscriber units 14 cross borders 50. The re-registration processes allow system 12 to identify the subscriber units' locations and to qualify services as required by the respective geopolitical jurisdictions.

Pattern 52 encompasses inhabited regions of the earth, and these inhabited regions vary in population density. For example, urban areas 56 represent regions of high population density where a larger concentration of subscriber units 14 are likely to reside. Accordingly, the size of static areas 54 may vary in response to the population density. In particular, smaller static areas 54 may be defined for regions of higher population density, as illustrated in connection with the static areas 54 where urban areas 56 reside.

Typically, a greater number of incoming calls are directed to high population density areas 56 than to less populated areas. Moreover, as cells 40 continually move over static areas 54, multiple cells 40 will less often coincide with smaller static areas 54 than with larger static areas 54. Thus, with high population density areas 56 placed in small static areas 54, a large number of incoming calls may be announced through ring messages broadcast in only one cell 40. Such ring messages need not be broadcast in the other cells 40 managed by system 12, and spectrum is conserved.

For purposes of the present invention, cells 40 and static areas 54 coincide when at least a portion of one overlies at least a portion of the other. A static area 54 and a cell 40 may coincide even though a portion of the static area 54 may not be covered by the cell 40 and even though a portion of the cell 40 may not cover the static area 54. By way of example, FIG. 2 illustrates a static area 54" as being the one of static areas 54 where system 12 believes a particular subscriber unit 14 to reside. A code identifying area 54 represents a known-by-system static area code. FIG. 2 illustrates that three of cells 40, labeled as cells 42, 44, and 46, are coincident with static area 54" for the instant in time depicted in FIG. 2.

To have confidence that a ring message signal can be received by a subscriber unit 14 in static area 54", system 12 may broadcast the ring message signal in each of the three coincident cells 42, 44, and 46. However, subscriber unit 14 may have moved since it informed system 12 of its location. Thus, the known-by-system code may be somewhat stale.

Figure 3:
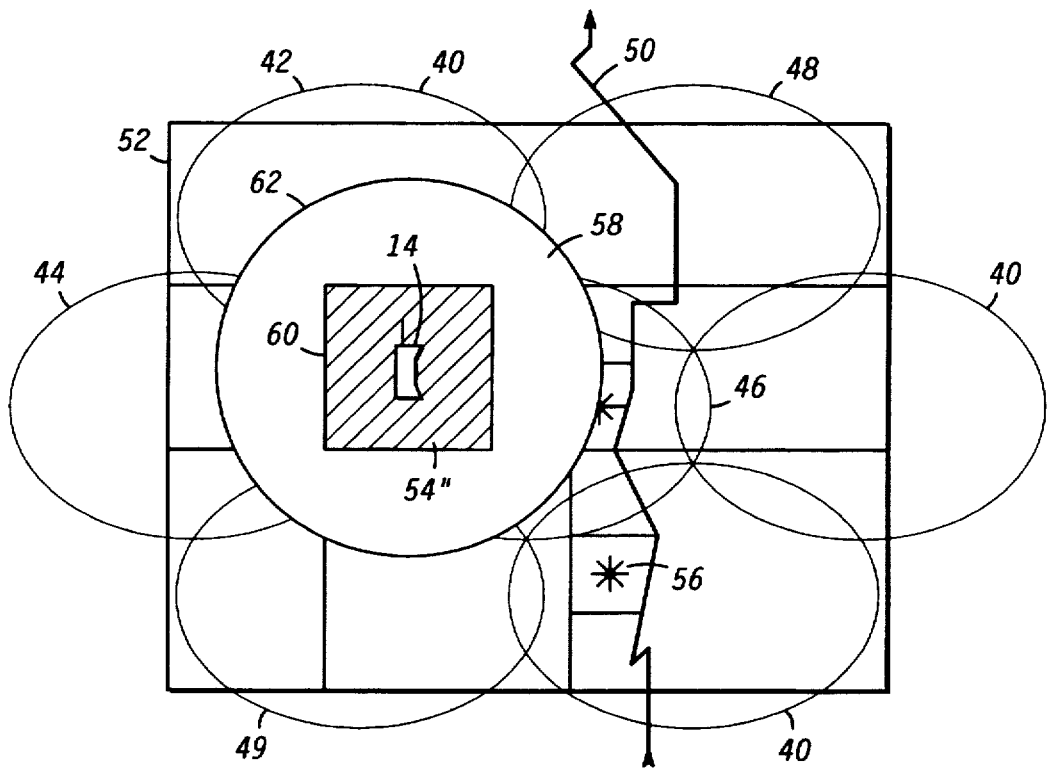
FIG. 3 shows a second illustration of the small portion of the service area shown in FIG. 2.

FIG. 3 shows another schematic illustration of the small portion of the service area and the instant in time depicted in FIG. 2. The FIG. 3 illustration differs from the FIG. 2 illustration in the inclusion of a static region 58 which is referenced to static area 54". In particular, static area 54" is surrounded by a boundary 60, as are all static areas 54. Static region 58 is surrounded by a boundary 62. Boundary 62 of static region 58 is configured to reside a predetermined distance beyond boundary 60 of static area 54". Similar static regions 58 (not shown) may surround other static areas 54.

System 12 may know the location of a subscriber unit 14 to a degree of precision commensurate with static area 54". However, system 12 may direct a ring message signal intended for the subscriber unit 14 to static region 58 to increase the chances of the subscriber unit 14 receiving the signal. As illustrated in FIG. 3, five of cells 40, labeled as cells 42, 44, 46, 48, and 49 coincide with static region 58, and system 12 may broadcast the ring message signal in all five of these cells 40. The cells 40 in which system 12 broadcasts a ring message signal for a single subscriber unit 14 are referred to as a target set of cells 40 herein. In the example illustrated in FIG. 3, cells 42, 44, 46, 48, and 49 are members of the target set of cells 40.

FIGS. 4–11 illustrate procedures and memory structures carried out by various nodes of network 10 to implement preferred embodiments of the present invention. In the preferred embodiments of the present invention, all subscriber units 14 independently perform substantially the same processes. Likewise, all satellites 16, MTSOs 18, and controllers 24 (see FIG. 1) perform substantially the same procedures as other satellites 16, MTSOs 18, and controllers 24, respectively. Since each node of system 12, such as satellites 16, MTSOs 18, and controllers 24, is or may be in data communication with other nodes of system 12, the precise location and distribution of the processes collectively performed by system 12 are less important considerations. From the perspective of a subscriber unit 14, system processes may be performed by any node in system 12 or may be distributed among several nodes.

Figure 4:
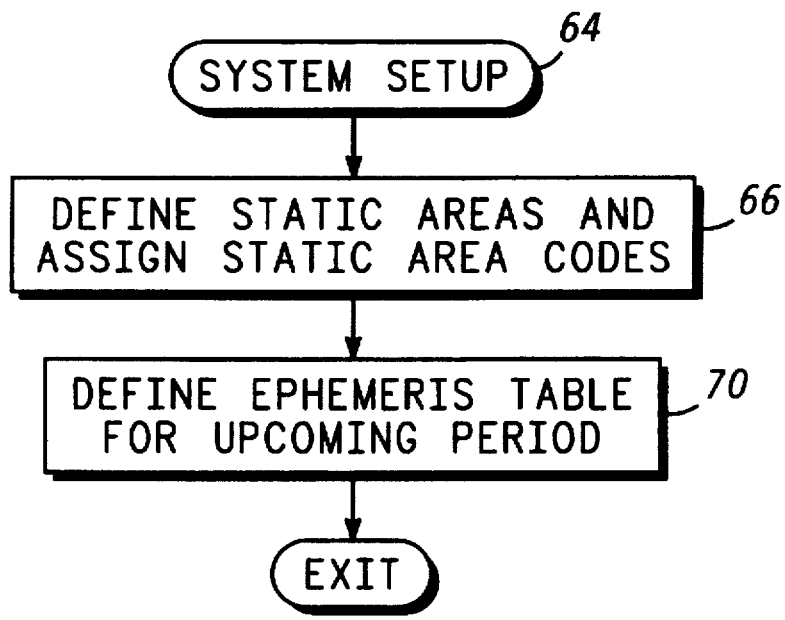
FIG. 4 shows a flow chart of a system setup process performed by a system portion of the network.

FIG. 4 shows a flow chart of a system setup process 64 performed by system 12. Generally speaking, process 64 sets up memory structures which are used in implementing a preferred embodiment of the present invention. These memory structures need not be set up together as indicated by FIG. 4. Rather, the various memory structures are merely set up so that they are available for use in connection with other processes that are discussed below. They may be updated as needed.

Figures 5, 6:
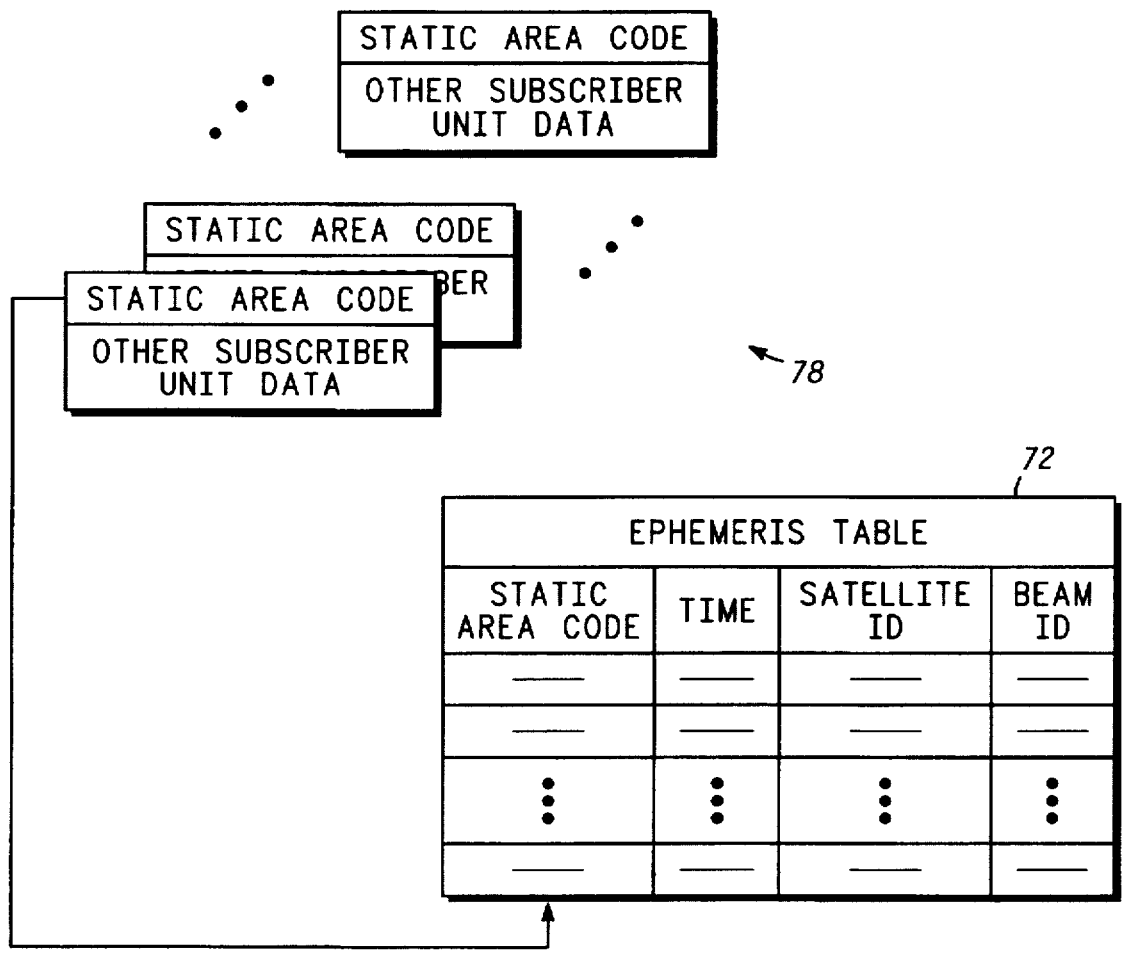
FIG. 5 shows a table of a first memory structure portion of the system.
FIG. 6 shows a table of a second memory structure portion of the system.

Process 64 performs a task 66 to define and record pattern 52 of static areas 54 (see FIGS. 2–3). Pattern 52 of static areas 54 is defined and recorded in a static area definition map 68, an exemplary block diagram of which is shown in FIG. 5. The shapes and sizes of static areas 54 are defined by area rules. Techniques known to those skilled in the art for defining areas in a manner compatible with data processing needs are used in defining the area rules. Task 66 additionally assigns unique static area codes in map 68 so that each static area 54 has its own static area code. As discussed above, static areas 54 are desirably defined so that any subscriber unit 14 (see FIGS. 13) in the service area of system 12 (see FIG. 1) will reside in one and only one static area 54.

Process 64 performs a task 70 to define an ephemeris table 72, an exemplary block diagram of which is shown in FIG. 6, for an upcoming period of time. Satellites 16 (see FIG. 1) move in relatively stable and predictable orbits around the earth. Thus, the positions of satellites 16 may be worked out in advance and stored in association with the times when the satellites 16 will be at those positions. Accordingly, ephemeris table 72 may record the location of each cell 40 (see FIG. 1) formed by each beam 32 (see FIG. 1) of each satellite 16 for various points in time. Table 72 specifies each static area 54 and the one or more cells 40 that coincide with the static area 54 at the specified points in time. The cells 40 may be specified by identifying the beams 32 and satellites 16 that form the cells 40.

Program control exits from process 64 so that system 12 can perform other processes when static area map 68 (see FIG. 5) and ephemeris table 72 (see FIG. 6) have been set up.

Figure 7:
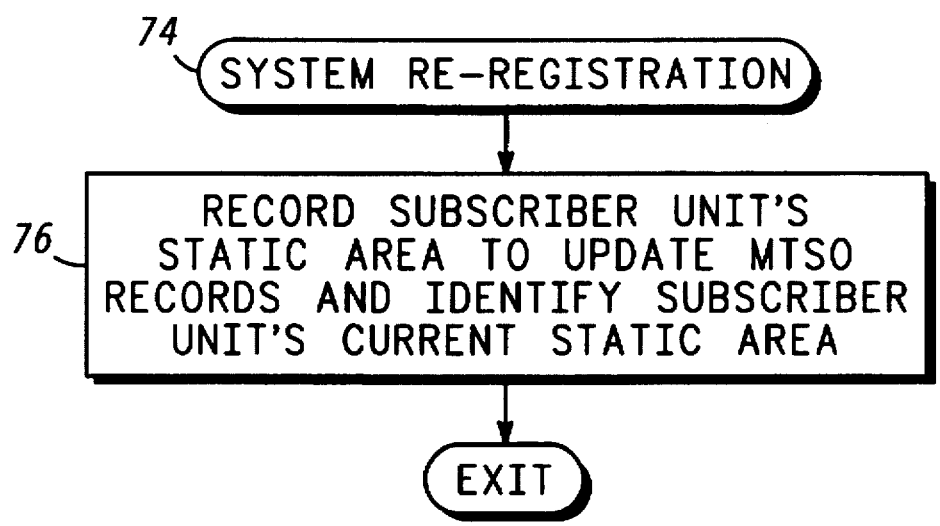
FIG. 7 shows a flow chart of a system re-registration process performed by the system.

FIG. 7 shows a flow chart of a system re-registration process 74 performed by system 12. Generally speaking, process 74 is performed when re-registration communications take place between system 12 and a subscriber unit 14. In particular, process 74 is performed when system 12 receives a message from a subscriber unit 14 that requests re-registration of that subscriber unit 14 with system 12. The re-registration message conveys the identity (ID) of the subscriber unit 14 making the request and data that set forth the location for the subscriber unit. The location data may specifically set forth geographical coordinates, convey Doppler, propagation, cell ID, and/or timing data that can be converted into a geographical coordinate, or may convey a static area code.

Process 74 performs a task 76 then exits so that system 12 may perform other processes. Task 76 records the static area 54 where the subscriber unit 14 resides. This static area 54 may be identified directly from data conveyed in the re-registration message or may be determined from geographic coordinates using static area definition map 68 (see FIG. 5). The static area's code is recorded in a subscriber register 78, an exemplary block diagram of which is shown in FIG. 6. Subscriber register 78 associates a static area code and other subscriber unit data for each subscriber unit 14 being handled by an MTSO 18 (see FIG. 1). The recording of a static area code may overwrite a previous static area code recorded for the subscriber unit 14 so that the MTSO records are updated and the subscriber unit's current static area 54 is known to system 12. This static area code becomes the known-by-system static area code for the subscriber unit 14.

After exiting from process 74, process 74 may repeat at some point in the future when system 12 receives another re-registration request from the subscriber unit 14. By repeating process 74, system 12 can track the movement of the subscriber unit 14.

Figure 8:
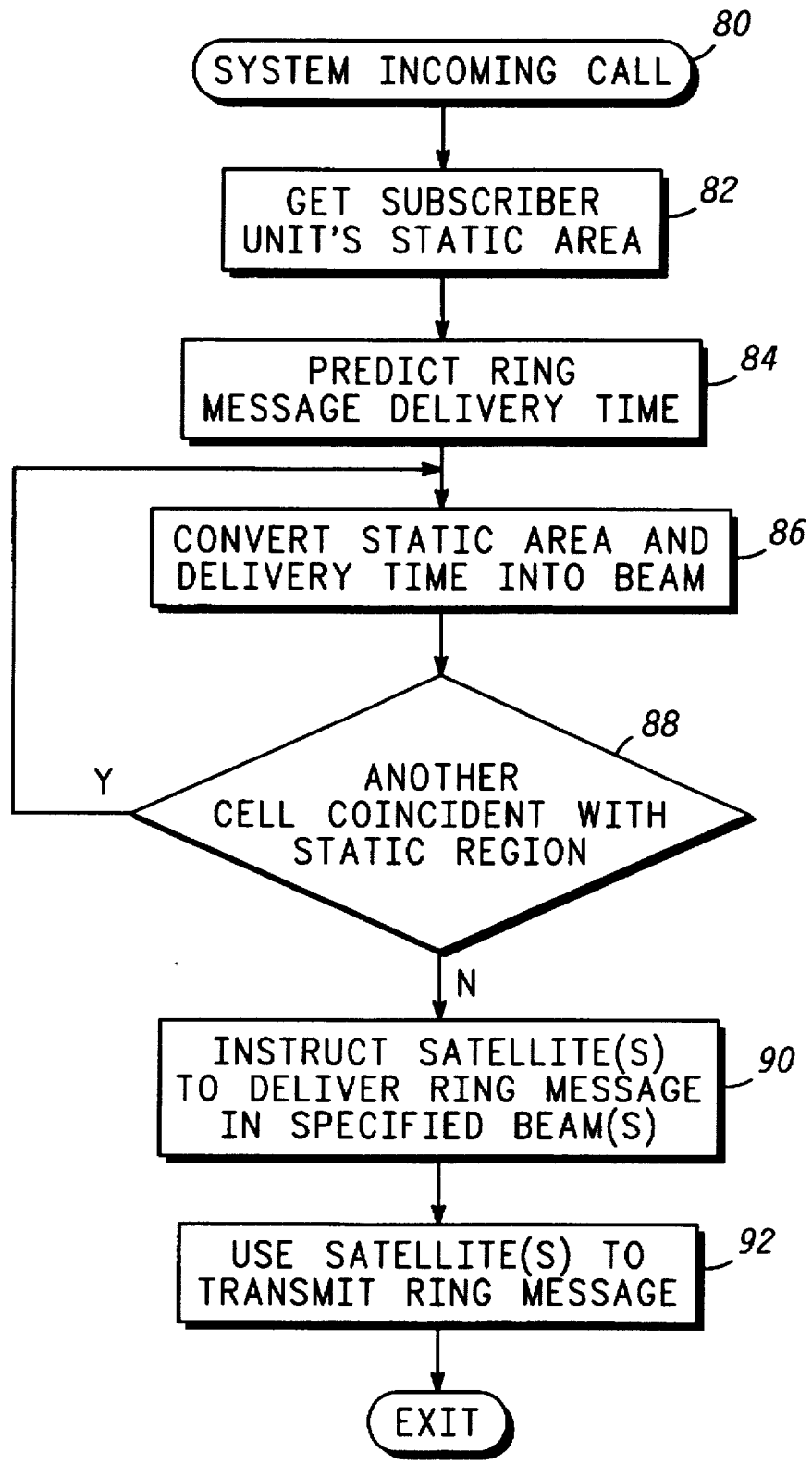
FIG. 8 shows a flow chart of a system incoming call process performed by the system.

FIG. 8 shows a flow chart of a system incoming call process 80 performed by system 12. Generally speaking, process 80 is performed when system 12 receives a message that requests system 12 to direct an incoming call to a subscriber unit 14. The message identifies the subscriber unit 14 through an ID code.

Process 80 performs a task 82 to get the identified subscriber unit's static area 54. Task 82 can learn the subscriber unit's static area 54 by consulting subscriber register 78 (see FIG. 6). Next, a task 84 predicts a delivery time for a ring message that system 12 will transmit. This delivery time will occur in the near future. The prediction may be made by adding a predetermined duration to the current time. Alternatively, the prediction may be made by defining a point in time which will serve as an instruction for a satellite 16 to follow in transmitting a ring message signal.

After task 84, a task 86 converts the static area code obtained above in task 82 and the delivery time obtained above in task 84 into a beam identity. Task 86 may consult ephemeris table 72 in performing its conversion. After task 86, a query task 88 determines whether another cell 40 is coincident with the static region 58 (see FIG. 3) that is related to the static area 54. Task 88 may desirably process the data included in ephemeris table 72 to add an additional cell identity to the set of target cells being formed. If another cell is coincident with static region 58, program control loops back to task 86 to identify this cell. Program control remains in a programming loop of tasks 86 and 88 until all members of the target set of cells have been identified.

When no other cells 40 are coincident with static region 58, a task 90 instructs the specified one or more satellites 16 from the target set of cells to deliver a ring message in the specified one or more beams 32. This instruction conveys an ID of the subscriber unit 14 to which the ring message is being directed. As discussed above, the instruction may additionally set forth a point in time at which the message should be delivered.

After task 90, a task 92 is performed to use the specified one or more satellites 16 to transmit the ring message. The ring message will be conveyed through ring message signals that are broadcast in all the cells 40 that are members of the target set of cells. Each ring message signal will cover a geographical range approximately equivalent to the cell 40 in which it is transmitted. After task 92, program control exits process 80, and system 12 continues with other processes.

Figure 9:
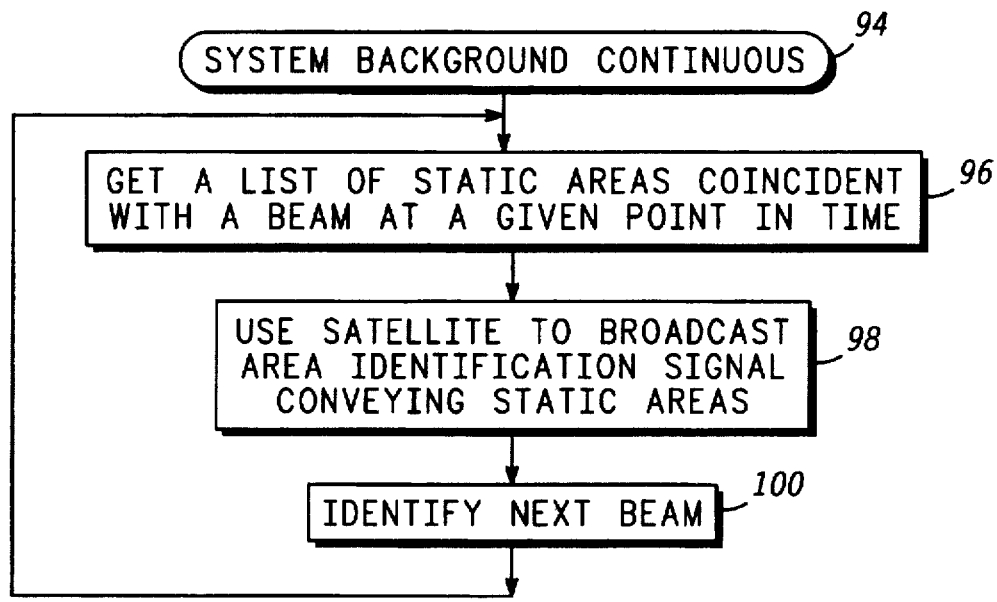
FIG. 9 shows a flow chart of a system background continuous process performed by the system.

FIG. 9 shows a flow chart of a system background continuous process 94 performed by system 12. Generally speaking, system 12 continually performs process 94 to broadcast location data so that subscriber units 14 will know when to engage in re-registration communications.

Process 94 performs a task 96 to get a list of static areas 54 that are coincident with a beam 32 at a given point in time. Task 96 may consult ephemeris table 72 (see FIG. 6) in obtaining the list. The point in time selected in task 96 represents an instant in the near future when a satellite 16 will transmit an area identification signal, discussed below. The particular beam 32 to which task 96 is directed varies as process 94 operates in a continuous loop.

After task 96, a task 98 uses the satellite 16 to broadcast the area identification signal. The area identification signal desirably includes static area codes to identify the static areas 54 coincident with the cell 40 formed by the satellite's beam 32 at the point in time when the signal is transmitted. Next, a task 100 identifies a next beam 32 through which an area identification signal will be transmitted, and program control loops back to task 96. Programming control continuously remains in this loop. Accordingly, in each cell 40 system 12 broadcasts data identifying the static areas 54 coincident with the cell 40 at the point in time that the data are transmitted.

Figure 10:
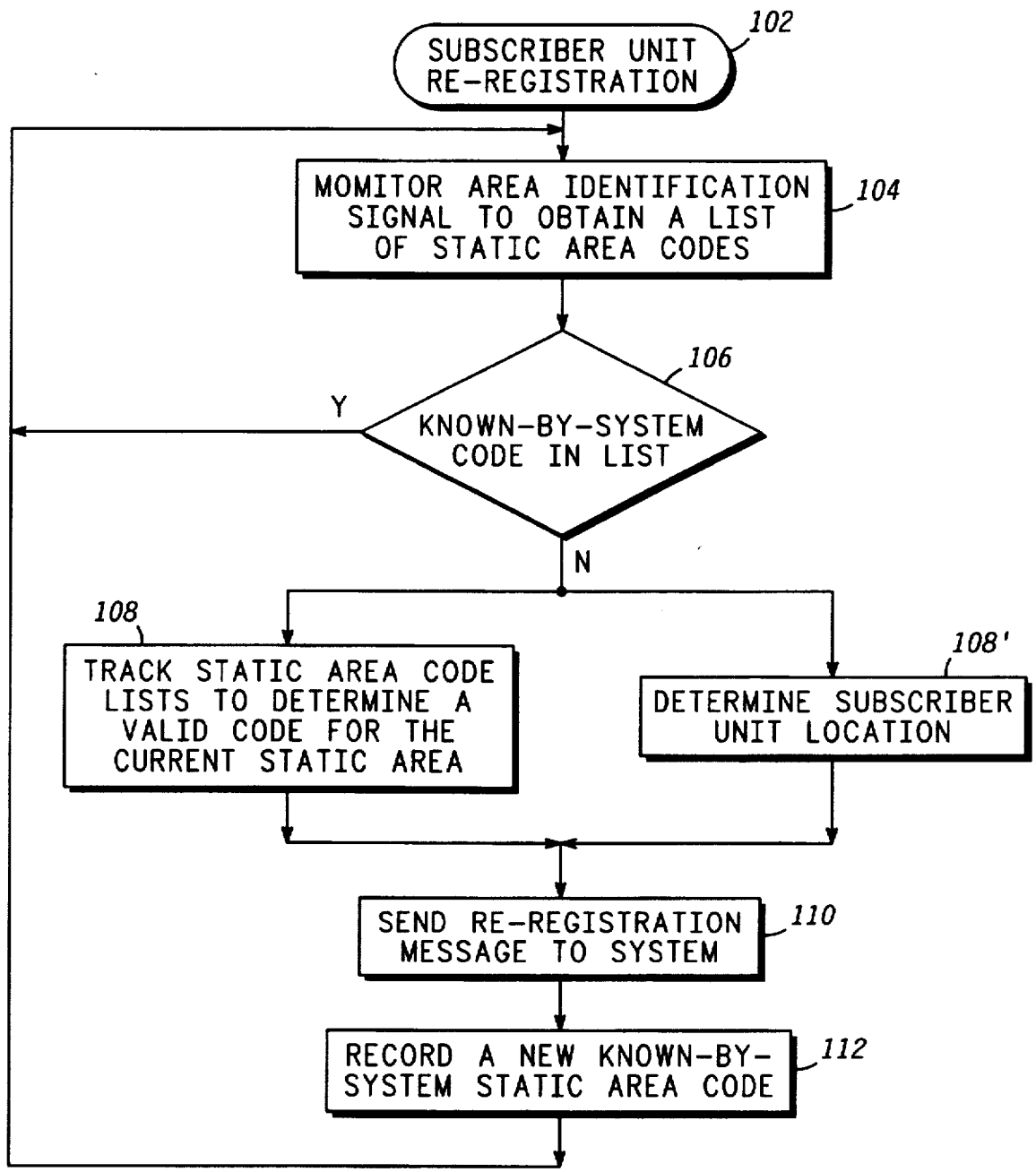
FIG. 10 shows a flow chart of a subscriber unit re-registration process performed by a subscriber unit constructed in accordance with the present invention.

FIG. 10 shows a flow chart of a subscriber unit re-registration process 102 performed by a subscriber unit 14. Generally speaking, subscriber unit 14 continually performs process 102 to determine when it needs to engage in re-registration communications with system 12. Through process 102 being performed by the population of subscriber units 14, network 10 strives to achieve a desirable re-registration frequency balance. Too many re-registrations is undesirable because spectrum resources are wasted through the overhead re-registration communications that could otherwise be used for payload communications. Too few re-registrations is also undesirable because subscriber units 14 may not receive incoming call ring messages when system 12 has stale known-by-system static area codes.

Process 102 performs a task 104 to monitor an area identification signal. The area identification signal is desirably the one transmitted in the cell 40 where the subscriber unit 14 is located at the time it is received. As discussed above in connection with FIG. 9, this signal conveys a list of static area codes, and task 104 obtains this list.

After task 104, a query task 106 examines the list of static area codes to determine if the known-by-system static area code is included in the list. As discussed below, subscriber unit 14 records the known-by-system code so that it may be obtained from its memory in task 106. So long as the known-by-system code is included in the list, subscriber unit 14 will be able to receive ring message signals directed to it and no re-registration is necessary. Thus, program control loops back to task 104.

When task 106 determines that its known-by-system code is not included in the list conveyed in the area identification signal, then subscriber unit 14 has moved a significant distance from its location when it last registered with system 12. When the known-by-system code is not in the list, either a task 108 or a task 108' is performed, depending upon the particular embodiment of the present invention being implemented.

Task 108 tracks static area code lists from the area identification signals it can receive to determine a valid static area code for its current static area 54. As subscriber unit 14 monitors area identification signals over a period of time, some of the static area codes in the lists may be present for a time, then disappear and later reappear. Other static area codes may be present for longer periods of time or even continuously. Task 108 may select the static area code which remains present for the longest period of time as a valid code.

Alternate task 108' uses a different technique for determining a location for subscriber unit 14. Task 108' may obtain data provided by a location system, such as the Global Positioning System (GPS), Loran, an aircraft navigation system, or the like. Alternately, task 108' may collaborate with a satellite 16 to measure Doppler, propagation delay, and other parameters for signals communicated between the satellite 16 and subscriber unit 14.

After tasks 108 or 108', a task 110 sends a re-registration message to system 12. The re-registration message informs system 12 of the subscriber unit's identity and of its location. The location may be conveyed through a static area code if task 108 was performed or through geographical coordinates or data which may be processed into geographical coordinates if task 108' was performed.

Next, a task 112 records a new known-by-system static area code for use above in task 106, then loops back to task 104. The known-by-system static area code recorded in task 112 may have been communicated to subscriber unit 14 from system 12 in response to the re-registration message. By looping back to task 104, process 102 repeats so that subscriber unit 14 can determine when it has moved beyond the range of ring message signals that system 12 may send to it in the future.

Figure 11:
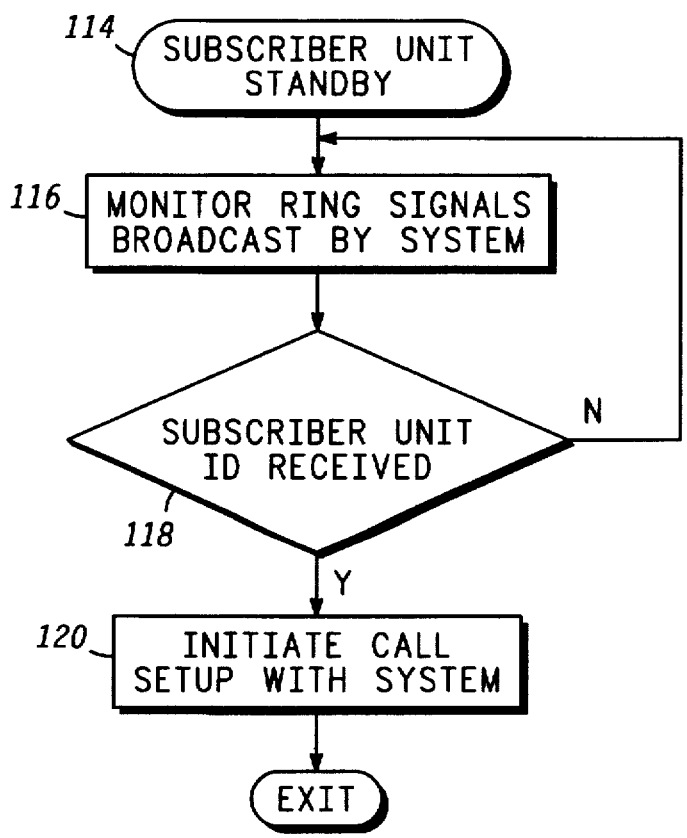
FIG. 11 shows a flow chart of a subscriber unit standby process performed by the subscriber unit.

FIG. 11 shows a flow chart of a subscriber unit standby process 114 performed by a subscriber unit 14. Generally speaking, subscriber unit 14 performs process 114 whenever it is powered up and not otherwise engaged in re-registration, setting up calls, conducting calls, or knocking down calls.

Process 114 performs a task 116 to monitor ring message signals being transmitted by system 12. When a ring signal is detected, a query task 118 determines whether the subscriber unit's ID is being conveyed by the ring signal. If a ring signal does not convey the subscriber unit's ID, then the ring signal is not being directed to the subscriber unit 14 and is probably being directed to another subscriber unit 14. In this situation, program control loops back to task 116 to continue monitoring ring signals.

When task 118 detects a ring message signal that conveys the subscriber unit's ID, a task 120 is performed to initiate a call setup with system 12. After task 120, program control exits standby process 114 to perform call setup, call conducting, and call knockdown and other processes.

In summary, the present invention provides an improved cellular communication network. A cellular communication network is provided in which incoming calls are directed through moving cells. Existing static-cell cellular equipment, such as MTSOs, may be used in connection with a moving-cell cellular communication network. Such existing equipment tracks subscriber units in static areas rather than cells. The static areas are converted into cells when the need arises. Only a small amount of spectrum resources are required to track subscriber unit locations. Re-registrations occur only when needed and not whenever a subscriber unit resides in a new cell. Only a small amount of memory and processing resources are required to track subscriber unit locations.

The present invention has been described above with reference to preferred embodiments. However, those skilled in the art will recognize that changes and modifications may be made in these preferred embodiments without departing from the scope of the present invention. For example, those skilled in the art will appreciate that subscriber units and the system may perform many additional procedures which are not directly related to the present invention and have not been discussed herein. Moreover, those skilled in the art will appreciate that the flow charts presented herein are intended to teach the present invention and that different techniques for implementing program flow that do not necessarily lend themselves to flowcharting may be devised. In particular, each task discussed herein may be interrupted to permit program flow to perform background or other tasks. In addition, the specific order of tasks may be changed, and the specific techniques used to implement the tasks may differ from system to system. These and other changes and modifications which are obvious to those skilled in the art are intended to be included within the scope of the present invention.

What is claimed is:

1. In a moving-cell cellular communication system wherein communications take place through antenna beams which form moving cells that move across earth and subscriber units occasionally receive incoming calls through a portion of said communications, a method of operating said system to determine where to direct said incoming calls, said method comprising the steps of:

defining a pattern of static areas so that one of said subscriber units resides in one of said static areas;

identifying the one of said static areas where said one subscriber unit resides;

receiving a request to direct an incoming call to said one subscriber unit;

determining, in response to said receiving step, which one of said antenna beams forms a first one of said moving cells, said first moving cell coinciding with said one of said static areas; and transmitting a message through the one of said antenna beams that forms said first moving cell.

2. A method as claimed in claim 1 wherein:

said defining step comprises the step of assigning static area codes to said static areas; and said identifying step comprises the step of recording the one of said static area codes that corresponds to the one of said static areas where said one subscriber unit resides.

3. A method as claimed in claim 1 wherein said determining step comprises the step of predicting which antenna beam will, during said transmitting step, form a moving cell coincident with said one of said static areas.

4. A method as claimed in claim 1 additionally comprising the step of repeating said identifying step to track movement of said subscriber unit.

5. A method as claimed in claim 1 wherein:

said determining step additionally determines which antenna beam forms a second moving cell, said second moving cell coinciding with said one of said static areas; and said transmitting step additionally transmits said message through the one of said antenna beams that forms said second moving cell.

6. A method as claimed in claim 1 wherein:

said one of said static areas is surrounded by a boundary;

said determining step determines a target set of said moving cells wherein said first moving cell is a member of said target set of moving cells, and each member of said target set of moving cells coincides with a static region whose boundary resides at least a predetermined distance beyond said boundary of said one of said static areas; and said transmitting step transmits said message through the ones of said antenna beams that form said target set of moving cells.

7. A method as claimed in claim 1 wherein:

said pattern of static areas encompasses inhabited regions of varying population density; and said defining step comprises the step of varying the size of said static areas in response to said population density.

8. A method as claimed in claim 1 wherein:

said pattern of static areas encompasses diverse geopolitical jurisdictions which have geopolitical borders; and said defining step comprises the step of configuring the shapes of said static areas to conform to said geopolitical borders.

9. A method as claimed in claim 1 additionally comprising the step of broadcasting an area identification signal through each antenna beam, wherein said area identification signal for each beam conveys data identifying one or more of said static areas that coincide with the one of said moving cells formed by the beam.

10. In a moving-cell cellular communication system wherein subscriber units occasionally engage in re-registration communications to inform the system of the locations of the subscriber units, a method of operating one of said subscriber units to determine when to permit a re-registration communication, said method comprising the steps of:

obtaining static area data that identify, a first of a plurality of static areas, said subscriber unit residing in said first area;

monitoring an area identification signal broadcast by said system, said area identification signal conveying data identifying one or more of said static areas that coincide with a moving cell to which said area identification signal is directed; and permitting said re-registration communication when said one static area is not identified as being one of said areas that reside within said moving cell to which said area identification signal is directed.

11. A method as claimed in claim 10 additionally comprising the step of receiving a ring signal which conveys data alerting said one subscriber unit to an incoming call, said ring signal having a range roughly equivalent to said moving cell to which said area identification signal is directed.

12. A method as claimed in claim 11 additionally comprising the step of repeating said monitoring step so that said subscriber unit can determine when it has moved beyond said range of said ring signal.

13. A moving-cell cellular communication system in which calls are managed for a wide service area and in which incoming calls intended for subscriber units are directed to only a portion of said service area, said communication system comprising:

one or more system nodes which project a plurality of antenna beams that form moving cells;

means for defining a pattern of static areas which collectively form said wide service area;

means for identifying the one of said static areas where one of said subscriber units resides; and a controller, in data communication with said defining means, said identifying means, and at least one of said system nodes, said controller being configured to respond when a request to direct an incoming call to said one subscriber unit occurs, to determine which antenna beam forms a first one of said moving cells, said first moving cell coinciding with said one of said static areas, and to instruct the one of said system nodes that corresponds to said first moving cell to transmit a ring signal in said first moving cell, said ring signal conveying data identifying said one subscriber unit.

14. A communication system as claimed in claim 13 wherein said controller is further configured to predict which antenna beam will, at the point in time when said ring signal is transmitted by said one system node, form said first moving cell.

15. A communication system as claimed in claim 13 wherein said identifying means is configured so that movement of said subscriber unit can be tracked.

16. A communication system as claimed in claim 13 wherein said controller is further configured to determine which antenna beam forms a second moving cell, said second moving cell also coinciding with said one of said static areas, and to command that said ring signal be transmitted in said second moving cell.

17. A communication system as claimed in claim 13 wherein:

said one of said static areas is surrounded by a boundary; and said controller is further configured to determine a target set of said moving cells wherein said first moving cell is a member of said target set of moving cells and each member of said target set of moving cells coincides with a static region whose boundary resides at least a predetermined distance beyond said boundary of said one of said static areas, and to command that said ring signal be transmitted through the ones of said antenna beams that form said target set of moving cells.

18. A communication system as claimed in claim 13 wherein:

said wide service area encompasses inhabited regions of varying population density; and said defining means is configured so that the size of said static areas varies in response to said population density.

19. A communication system as claimed in claim 13 wherein:

said wide service area encompasses diverse geopolitical jurisdictions which have geopolitical borders; and said defining means is configured so that the shapes of said static areas conform to said geopolitical borders.

20. A communication system as claimed in claim 13 wherein said one or more system nodes are configured to broadcast an area identification signal through each of said antenna beams, wherein said identification signal for each beam conveys data identifying one or more of said static areas that coincide with the one of said moving cells formed by the beam.

* * * * *